US008469436B2

(12) United States Patent
Wensing et al.

(10) Patent No.: US 8,469,436 B2
(45) Date of Patent: Jun. 25, 2013

(54) CLAMPING DEVICE

(75) Inventors: Udo Wensing, Oberhausen (DE); Hans Boris Hahnen, Kamp-Lintfort (DE); Frank Neumeyer, Willich (DE); Frank Frentzen, Viersen (DE); Rolf Birkenbach, Krefeld (DE); Joachim Rossbach, Viersen (DE); Karl Kemmerling, Solingen (DE); Axel Scholz, Moers (DE); Tim Lauterbach, Moenchengladbach (DE); Rolf Weigelt, Duisburg (DE); Ragnvald Andersson, Graestorp (SE)

(73) Assignee: VBG Group Truck Equipment GmbH, Krefeld (DE)

( * ) Notice: Subject to any disclaimer, the term of this patent is extended or adjusted under 35 U.S.C. 154(b) by 248 days.

(21) Appl. No.: 12/872,360

(22) Filed: Aug. 31, 2010

(65) Prior Publication Data

US 2011/0047760 A1 Mar. 3, 2011

(30) Foreign Application Priority Data

Sep. 3, 2009 (EP) .................................... 09011299

(51) Int. Cl.
*B60J 7/185* (2006.01)

(52) U.S. Cl.
USPC .. 296/104; 296/105; 296/186.4; 292/DIG. 30

(58) Field of Classification Search
USPC ........ 296/104, 105, 186.4, 155; 292/DIG. 30, 292/31
See application file for complete search history.

(56) References Cited

U.S. PATENT DOCUMENTS

| | | | | |
|---|---|---|---|---|
| 2,961,262 | A * | 11/1960 | Nockels | 292/113 |
| 3,534,992 | A * | 10/1970 | Swanson | 292/113 |
| 4,943,110 | A | 7/1990 | Pastva | |
| 5,984,382 | A * | 11/1999 | Bourne et al. | 292/113 |
| 6,343,815 | B1 * | 2/2002 | Poe | 292/113 |
| 6,905,161 | B2 * | 6/2005 | Fliege et al. | 296/100.18 |
| 2009/0072576 | A1 | 3/2009 | LeBlanc | |

FOREIGN PATENT DOCUMENTS

JP 54067424 U 5/1979

* cited by examiner

*Primary Examiner* — Dennis Pedder
(74) *Attorney, Agent, or Firm* — Berenato & White, LLC

(57) ABSTRACT

A clamping device for sliding roofs is provided in the region of the guidance and runner rail. An actuation lever is pivotable between locking and release positions. A clamping element is modifiable in its position by means of the actuation lever, which coacts with a countermember of the end carriage and moves the end carriage to the end of the guidance and runner rail. The clamping element is aligned with the guidance and runner rail, and is shiftable in a longitudinal direction, between a locking position retaining the end carriage, and a release position. The guide comprises in a subregion on the underside an open space such that upon shifting of the actuation lever into the release position, the clamping element is at least partly lowerable sufficiently that the end carriage can be displaced away from the end of the guidance and runner rail.

5 Claims, 5 Drawing Sheets

CLAMPING DEVICE

CROSS-REFERENCE TO RELATED APPLICATIONS AND CLAIM TO PRIORITY

This application is related to application number 09011299.6-1268, filed Sep. 3, 2009, in the European Patent Office, the disclosure of which is incorporated herein by reference and to which priority is claimed.

FIELD OF THE INVENTION

The present invention relates to a clamping device for a sliding roof that is displaceable along a guidance and runner rail, the clamping device being provided in the region of the guidance and runner rail and comprising an actuation lever arranged pivotably about an axis and shiftable between a locking position and a release position, as well as a clamping element modifiable in its position by means of the actuation lever, which element coacts with a countermember provided on the end carriage and moves the end carriage to the end of the guidance and runner rail.

BACKGROUND OF THE INVENTION

Clamping devices that are arranged in the cargo space are known from practical use in a wide variety of embodiments. The result is both that actuation is cumbersome and, depending on the embodiment, even quite time-consuming to use as a result of tedious actuation of a crank; and the cargo area is reduced. Damage can furthermore occur to the clamping system as a result of the cargo, or during loading and unloading.

It is an object of the invention to avoid the aforesaid disadvantages and to describe a clamping system that is easily operable.

SUMMARY OF THE INVENTION

The object is achieved in that the clamping element is arranged in a guide aligned in accordance with the course of the guidance and runner rail, and is shiftable in its guide in a longitudinal direction, by way of a connecting element arrested in articulated fashion respectively on both the clamping element and the actuation lever, between a locking position retaining the end carriage at the end of the guidance and runner rail, and a release position, the guide comprising in a subregion on the underside an open space such that upon shifting of the actuation lever into the release position, the clamping element is at least partly lowerable sufficiently that the end carriage can be displaced away from the end of the guidance and runner rail. The result is that no room is required in the cargo space, since the clamping device is provided outside, in particular beneath, the cargo surface.

The clamping element can also be additionally tiltable upon lowering, so that a partial lowering results and the elevated region of the clamping element that coacts with the countermember is lowered sufficiently that the countermember is movable across the clamping element.

The articulation of the connecting element on the actuation lever can preferably be provided in such a way that upon shifting of the actuation lever into the locking position, said articulation takes place across a dead-center point, so that automatic locking occurs and release cannot occur without the action of a force.

According to the present invention, the clamping element can be connected to the connecting element via a compression spring element that, when the actuation lever is in its locking position, enables a slight shifting within the guide, thus allowing adaptation, within certain limits, to changes in the location of the countermember.

In a preferred exemplifying embodiment of the invention, a locking element can be associated with the actuation lever for immobilization in its locking position, so that even further improved protection against inadvertent locking release by the clamping element is provided.

Advantageously, the locking element can be arranged on the actuation lever and can be embodied to coact with a corresponding cutout in the clamping device.

In a preferred exemplifying embodiment of the invention, the actuating lever can be embodied extensibly, in particular against a return force, so that an elongation of the lever arm for easier actuation is possible, and the overall size when not in use is reduced.

For this, an elongation element can also be foldable out of the actuation lever, in particular against a return force.

For accurate adaptation, the countermember provided on the end carriage can be embodied to be shiftable in its position and to be correspondingly settable in a preselected position, so that an excessive clamping force can be reduced or an insufficient clamping force can be magnified.

For this purpose the clamping element can also be provided to be shiftable in the guide against a return force, and can be connected to the connecting element.

BRIEF DESCRIPTION OF THE DRAWINGS

An exemplifying embodiment of the invention that is depicted in the drawings will be explained below. In the drawings.

DETAILED DESCRIPTION OF THE PREFERRED EMBODIMENT(S)

Figure 1:
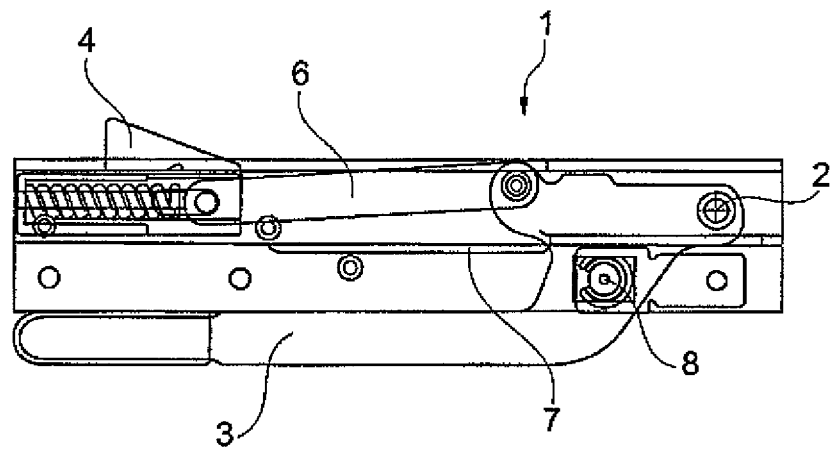
FIG. 1 is a side view of a first exemplifying embodiment of a clamping device according to the present invention in a closed state.

Matching reference characters are used in all the Figures for identical or similar components.

Figure 2:
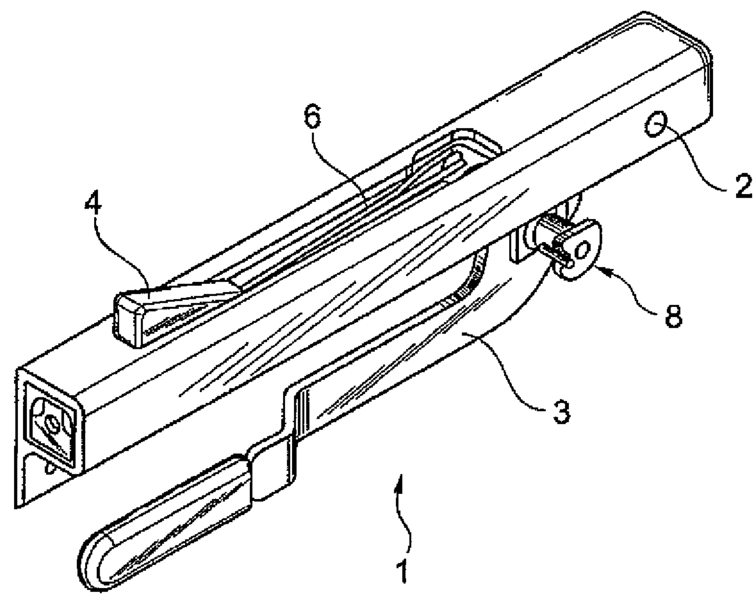
FIG. 2 is a perspective view, obliquely from above, of the subject of FIG. 1.

The Figures show a clamping device 1 for a sliding roof (not depicted in the drawings) that is displaceable along guidance and runner rails 15, clamping device 1 being provided in the region of the guidance and runner rail and comprising an actuation lever 3 arranged pivotably about an axis 2 and shiftable between a locking position (FIGS. 1 and 2) and a release position (FIGS. 5 and 6), as well as a clamping element 4 modifiable in its position by means of actuation lever 3.

Figure 5:
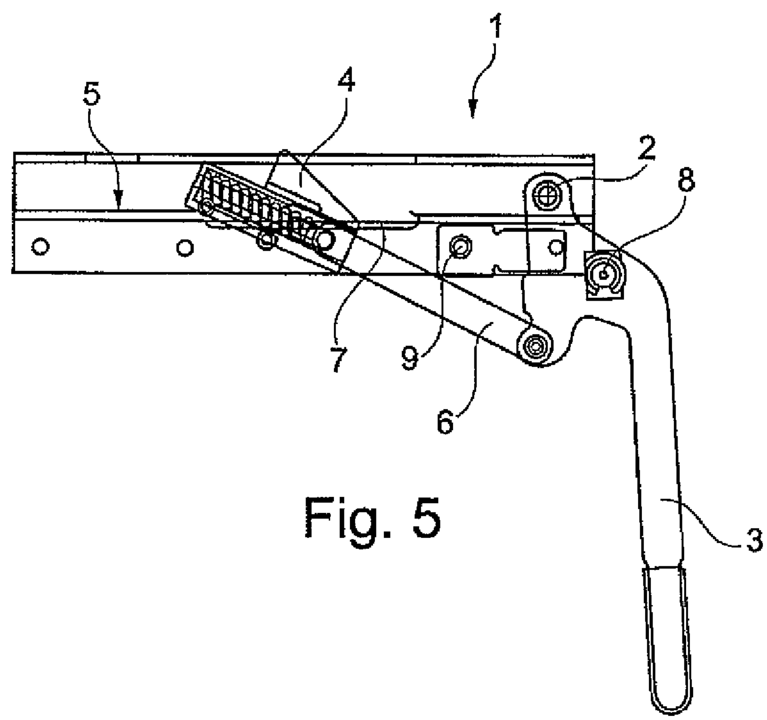
FIG. 5 shows the subject of FIG. 1 in an open state.
Figure 6:
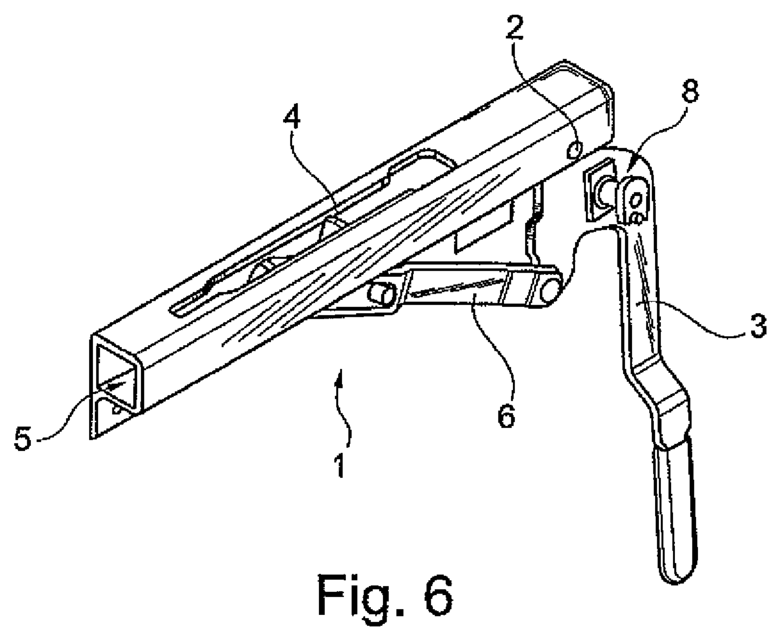
FIG. 6 is a perspective view, obliquely from above, of the subject of FIG. 5.

The clamping element 4 is arranged in a guide 5 aligned in accordance with the course of guidance and runner rail 15, and is shiftable in its guide 5 in a longitudinal direction, by way of a connecting element 6 attached in articulated fashion respectively to both the clamping element 4 and actuation lever 3, between a locking position (FIGS. 1 and 2) retaining an end carriage 10 (depicted in the drawing FIGS. 7 and 8) at the end of the guidance and runner rail 15, and a release position (FIGS. 5 and 6).

Guide 5 exhibits, in a subregion on the underside, an open space 7 such that upon shifting of actuation lever 3 into the release position, clamping element 4 is at least partly lowerable sufficiently that end carriage 10 (not depicted in the drawings) can be displaced away from the end of guidance and runner rail 15.

Figure 3:
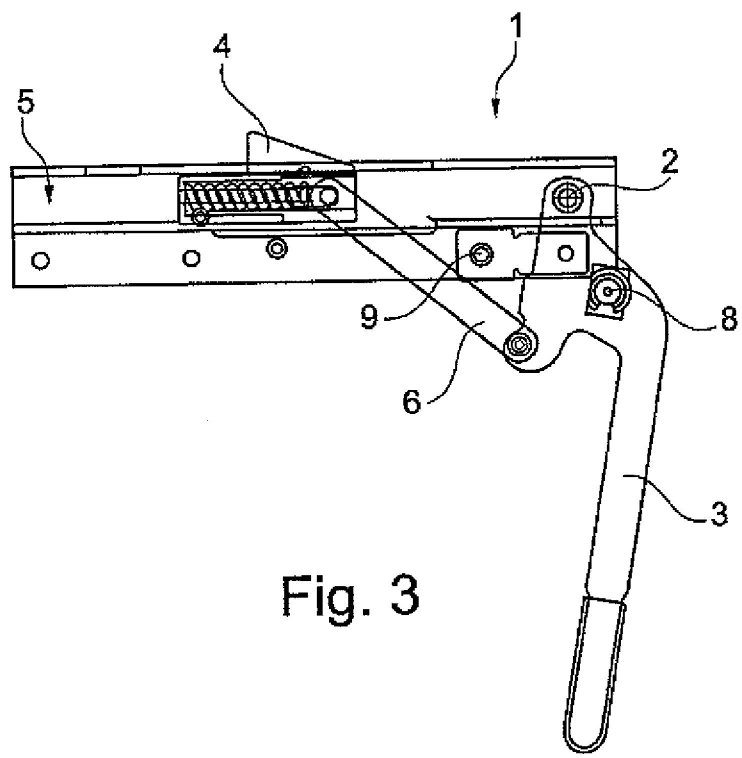
FIG. 3 shows the subject of FIG. 1 in a half-open state.
Figure 4:
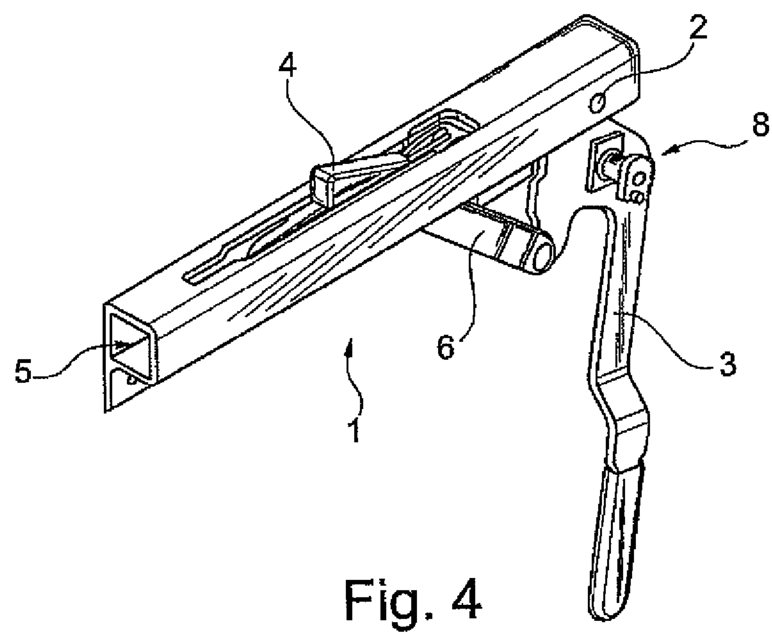
FIG. 4 is a perspective view, obliquely from above, of the subject of FIG. 3.

Associated with actuation lever 3 is a locking element 8 for immobilization in its locking position, which element is arranged on actuation lever 3 and is embodied to coact with a corresponding cutout 9 in the guide (5) of the clamping device 1. The result is that initially, upon opening pivoting of actuation lever 3, clamping element 4 is pulled back by connecting element 6 in guide 5 (see FIGS. 3 and 4) and then, upon further opening pivoting of actuation lever 3, is partly lowered (in accordance with FIGS. 5 and 6) through open space 7 in guide 5, so that clamping element 4 no longer projects out of guide 5 on the upper side and thus also no longer coacts with a countermember 11, provided on end carriage 10 and likewise not depicted in the drawings, so that end carriage 10 is freely movable.

Figure 7:
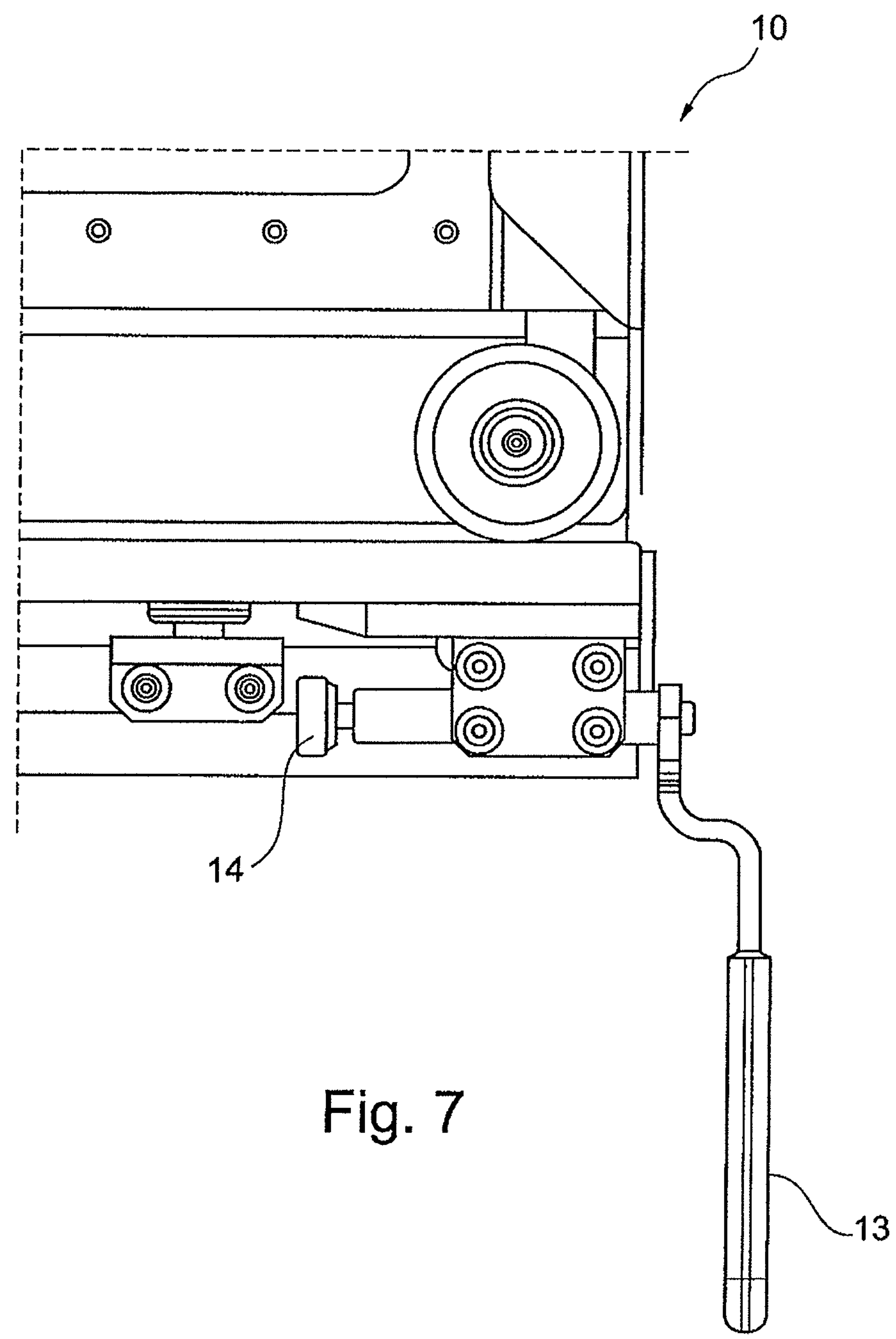
FIG. 7 is a detail view of a second exemplifying embodiment of a clamping device according to the present invention.

For accurate adaptation of clamping device 1 to the required clamping force and to the required clamping travel of clamping element 4, countermember 11 provided on end carriage 10 has (as depicted in FIG. 7) a stop 14 embodied to be shiftable in its position and correspondingly settable in a preselected position, so that an excessive clamping force can be reduced or an insufficient clamping force can be magnified. Stop 14 is adjusted by way of a corresponding actuation element embodied, in the exemplifying embodiment depicted, as crank 13.

Alternatively, a stop 14 that is shiftable in its position and correspondingly settable in a preselected position can be associated with countermember 11 provided on end carriage 10, which stop is provided in vehicle-mounted fashion and not on end carriage 10.

Figure 8:
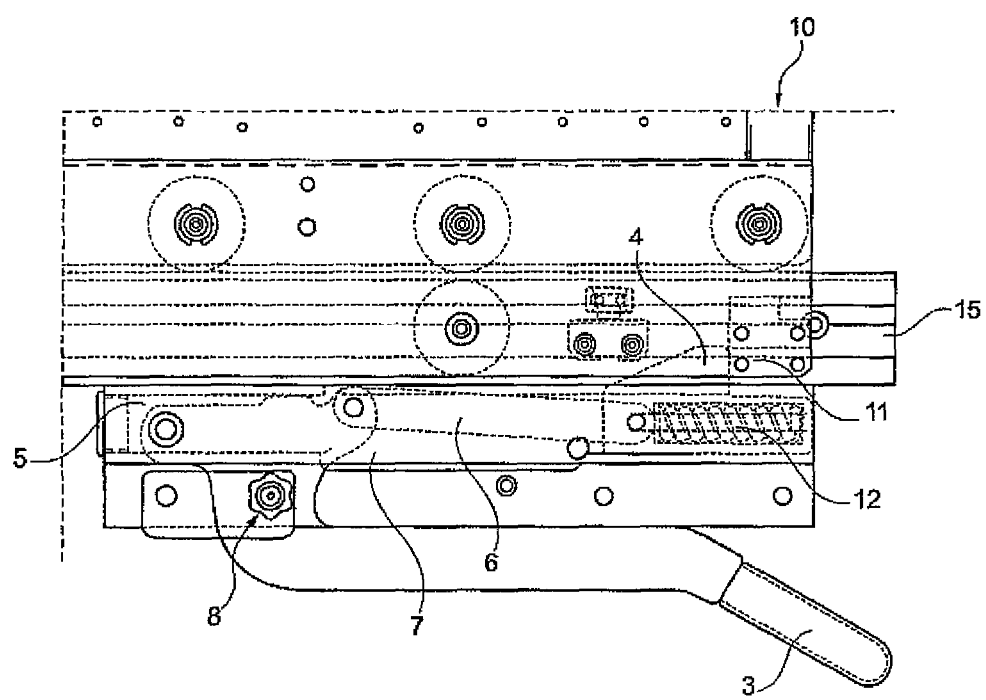
FIG. 8 is a detail view of a third exemplifying embodiment of a clamping device according to the present invention.

As shown in FIG. 8, for accurate adaptation of clamping device 1 to the required clamping force and to the required clamping travel of clamping element 4, clamping element 4 can be provided shiftably in guide 5 against the return force of a return element, in particular a compression spring element, embodied as helical spring 12, and can be connected to connecting element 6, so as to produce automatic adaptation.

We claim:

1. A clamping device (1) for a sliding roof displaceable along guidance and runner rails, the clamping device (1) being provided in the region of a guidance and runner rail (15), the clamping device comprising:

an actuation lever (3) arranged pivotably about an axis (2) and shiftable between a locking position and a release position;

a clamping element (4) modifiable in its position by means of the actuation lever (3);

a guide (5) aligned with the course of the guidance and runner rail (15);

a connecting element (6) attached in articulated fashion respectively to both the clamping element (4) and the actuation lever (3);

the clamping element (4) coacting with a countermember (11) provided on an end carriage (10) and moves the end carriage (10) to the end of the guidance and runner rail (15);

the clamping element (4) is arranged in the guide (5) and is shiftable in the guide (5) in a longitudinal direction, by way of the connecting element (6) between a locking position retaining the end carriage (10) at the end of the respective guidance and runner rail (15), and a release position;

the guide (5) comprising in a subregion on the underside an open space (7) such that upon shifting of the actuation lever (3) into the release position, the clamping element (4) is lowerable to the extent that the end carriage (10) can be displaced away from the end of the guidance and runner rail (15);

the clamping element (4) is connected to the connecting element (6) via a compression spring element (12) so that, when the actuation lever (3) is in the locking position thereof, enables a slight shifting within the guide (5).

2. A clamping device (1) for a sliding roof displaceable along guidance and runner rails, the clamping device (1) being provided in the region of a guidance and runner rail (15), the clamping device comprising:

an actuation lever (3) arranged pivotably about an axis (2) and shiftable between a locking position and a release position;

a clamping element (4) modifiable in its position by means of the actuation lever (3);

a guide (5) aligned with the course of the guidance and runner rail (15);

a connecting element (6) attached in articulated fashion respectively to both the clamping element (4) and the actuation lever (3);

the clamping element (4) coacting with a countermember (11) provided on an end carriage (10) and moves the end carriage (10) to the end of the guidance and runner rail (15);

the clamping element (4) is arranged in the guide (5) and is shiftable in the guide (5) in a longitudinal direction, by way of the connecting element (6) between a locking position retaining the end carriage (10) at the end of the respective guidance and runner rail (15), and a release position;

the guide (5) comprising in a subregion on the underside an open space (7) such that upon shifting of the actuation lever (3) into the release position, the clamping element (4) is lowerable to the extent that the end carriage (10) can be displaced away from the end of the guidance and runner rail (15);

the articulation of the connecting element (6) on the actuation lever (3) provided in such a way that upon shifting of the actuation lever (3) into the locking position, the articulation takes place across a dead-center point;

the clamping element (4) connected to the connecting element (6) via a compression spring element that, when the actuation lever (3) is in its locking position, enables a slight shifting within the guide (5).

3. The clamping device (1) according to claim 1, further comprising a locking element (8) is associated with the actuation lever (3) for immobilization in the locking position thereof.

4. The clamping device (1) according to claim 1, wherein the actuating lever (3) is embodied extensibly against a return force.

5. The clamping device (1) according to claim 1, wherein the countermember (11) provided on the end carriage (10) is shiftable in its position and is correspondingly settable in a preselected position.

* * * * *